Oct. 11, 1960 — A. C. PETERSON — 2,955,422
POWER TURBINE AND PRESSURE FLUID MEANS
Filed Sept. 19, 1958 — 2 Sheets-Sheet 1

INVENTOR
Adolph C. Peterson

Oct. 11, 1960 A. C. PETERSON 2,955,422
POWER TURBINE AND PRESSURE FLUID MEANS
Filed Sept. 19, 1958 2 Sheets-Sheet 2
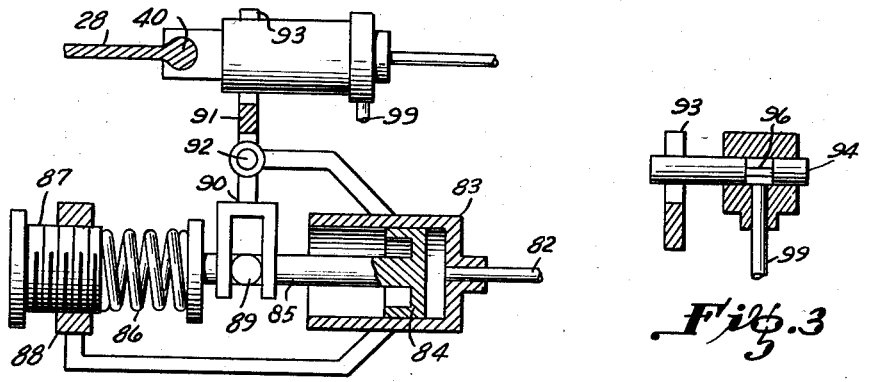
Fig.2
Fig.3
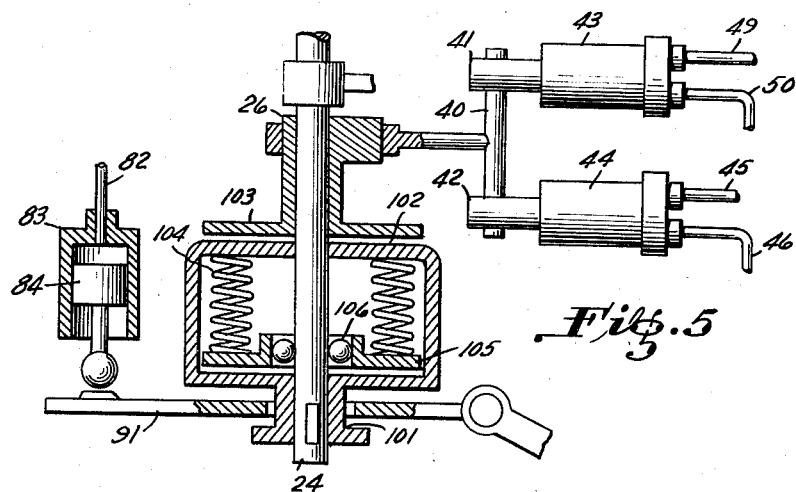
Fig.5
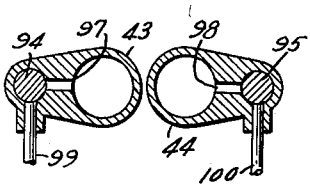
Fig.4
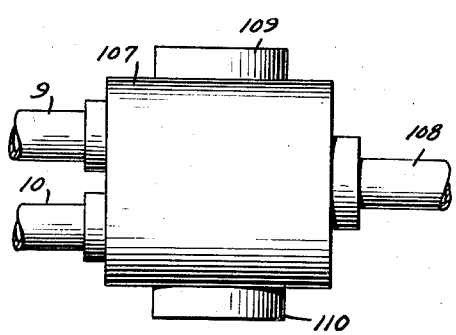
Fig.6
INVENTOR
Adolf C. Peterson.

United States Patent Office 2,955,422
Patented Oct. 11, 1960

2,955,422

POWER TURBINE AND PRESSURE FLUID MEANS

Adolphe C. Peterson, 4623 Bruce Ave. S., Minneapolis, Minn.

Filed Sept. 19, 1958, Ser. No. 762,091

10 Claims. (Cl. 60—39.18)

My invention relates to such power units as have a power turbine in connection with a gas generating means to produce a power fluid for the power turbine, and it is called—power turbine and pressure fluid means.

The turbine means, which have thus far been produced or proposed for the driving of vehicles and other uses, have been inefficient in their utilization of fuel in proportion to power produced, and this has prevented their common adoption for such purposes, and another difficulty has been the noise produced and the heat of exhaust gases. A principal difficulty has been the insufficient ability for rapid acceleration in use of vehicles and other powered devices. The chief object of this invention is, therefore, the provision of a type of power plant utilizing the abilities of a turbine, which will, at least in considerable degree, overcome the disadvantages and disabilities of such turbines as have been tried for the objects designated. The object is, especially, to provide a power plant which is especially adapted for use in the driving of automobiles, tractors, trucks, locomotives, railcars, air and water propulsion means. It is an object to provide such a means in a plant which has better usage of the heat of gases exhausted from a turbine. It is an object to provide such a means which has better usage of the air compressed for combustion and driving of a turbine, and therefore has better efficiency in the aggregate in the use of the plant. It is also an object, that a sufficient power can be produced with a smaller apparatus, so that weight and space required, are less. It is an object of this invention, to provide a new form of cycle of combustion and heat utilization, so that there is a dual system of generation of heat and power, resulting from the fact that there is used a so-called open cycle in conjunction with a so-called closed cycle, wherein the power fluid may be used over and over, repeatedly. In general the object is improvement of power plant means for any uses, such as stationary power plants as for electric generating plants, and such as ship power plants, and such as power means for automotive vehicles of all descriptions, and such as may be used in airplanes.

In the accompanying drawings which illustrate my device, the device is shown in a substantially complete form, some detailed means, such as are commonly known, being not shown, and some detail means, of the device, being shown also in a modified form.

The principal devices and combinations of devices comprising my invention, are as hereinafter described and as defined in the claims, and as illustrated in the accompanying drawings, which are now, briefly described, as follows.

Figure 1 is a view illustrating the several units which comprise the device, the principal units being shown in horizontal cross section, which is, as to each unit, a section through the axis of the device or unit, some parts in each of these units being shown in full plan view, some parts being broken away, the pump units, other than air compressor means, being shown in plan view, with some detail means thereof, broken away.

Figure 2 is a vertical section on the line 2—2 of Figure 1, this section being through a detail part of one pump unit, that is through a control means therefor, this control means, or the chief elements thereof being located under the pump means, as in Figure 1, some parts being broken away, and some shown in vertical side elevation.

Figure 3 is a detail section vertically through one control valve, and is on the line 3—3 of Figure 1, this valve being a part of the control means, as in Figure 2, another control valve in Figure 1, is substantially similar, and is not illustrated, in this same detail.

Figure 4 is a vertical detail section on the line 4—4 of Figure 1.

Figure 5 is a view to illustrate a modified control means, that is another type thereof.

Figure 6 is the condenser detail plan view.

Figure 1:
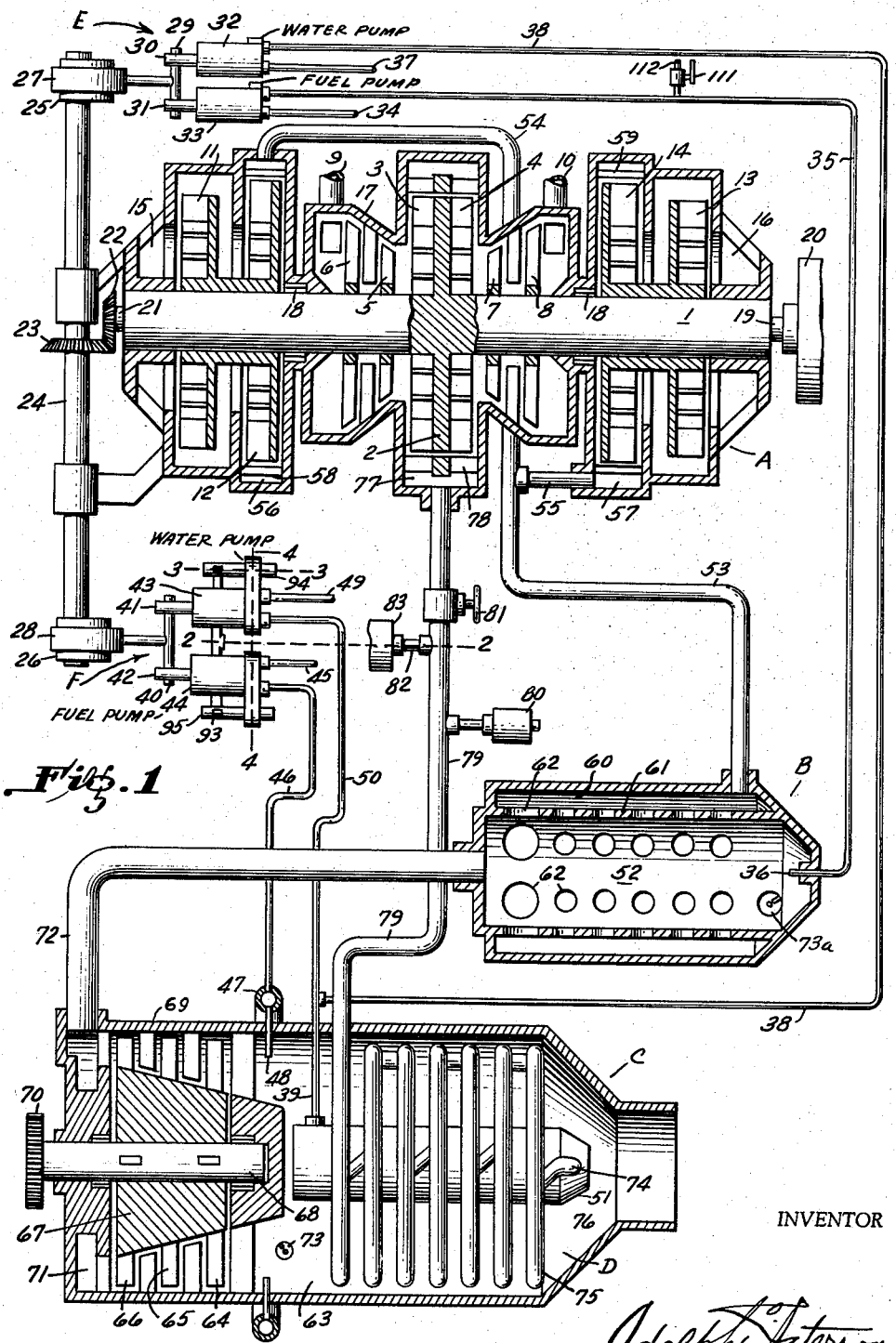

Referring first to the device as illustrated in Figures 1, 2, 3, and 4, but most especially in Figure 1, there is here shown a device or power plant, which embodies generally a pressure fluid generator A, a combustion chamber means B, a power or work turbine C, a secondary fluid generator D, a pump unit E which is a primary pump unit, and a pump unit F which is a secondary pump unit.

The pressure fluid generator A has a main shaft 1 which is the chief operating means of the unit and this main shaft 1 has centrally of its length or axis, an integral or otherwise formed disk 2 which is perpendicularly of the main shaft 1, at right angles to the latter's axis, and has affixed inward flow, that is radially inward flow blade sets 3 and 4, annularly of shaft 1, one set on one side of disk 2 and the other set on the other side of disk 2. The main shaft 1 has axial flow blade stages 5, 6, on one side of disk 2, and axial flow blade stages 7, 8, on the other side laterally of disk 2. The inward flow blades set 3 discharges inwardly and then axially of shaft 1 toward blades stages 5, 6. The inward flow blades 4 discharge inwardly and then axially of shaft 1, that is parallel to the axis, toward blade stages 7, 8, and the discharges therefrom pass through exhaust passages or conduits 9 and 10, respectively, these designated blade stages and exhaust being a part of a flow system for the so-called secondary fluid, which is a vaporized fluid, as steam.

The main shaft 1 has on one end a compressor unit for air which comprises the first or low pressure centrifugal compressor 11 and the second or high stage pressure centrifugal compressor 12. The main shaft 1 has on the opposite end of it, axially, a compressor unit for air which comprises the first or low pressure centrifugal compressor 13, and the second or high stage centrifugal compressor 14. The air compressor means, designated, has air intake passage means 15, for the one compressor means (low stage) and 16 for the other compressor means (low stage).

The turbine means described, for the secondary fluid system, including elements 3, 4, 5, 6, 7, 8, 9, 10, has a casing 17 generally cylindrical in form, and having bearings 18 in which the main shaft 1 is rotatably mounted, for rotation as a unit with its attached or integrally formed blade stages 3, 4, 5, 6, 7, 8, and the attached or integrally formed compressor means 11, 12, 13, 14.

The main shaft at one end has an extension 19 which has on it the armature of an electric motor 20, which may be a motor-generator and is only diagrammatically shown. The main shaft 1 has at its opposite end, an extension 21 which has fixed thereon a small bevel gear 22 in engagement with a larger bevel gear 23, which latter is fixed on an accessory shaft 24 to drive the latter at a relatively slower speed. The accessory shaft 24 at one end has an eccentric 25, and has at the opposite end an eccentric 26 both driven uniformly with the accessory shaft 24, one reciprocating connecting rod 27 and the other reciprocating connecting rod 28. Connecting rod 27 by its integral rod or axle 29, which is oscillative in the near ends of pump pistons 30 and 31, reciprocates those pump pistons (plungers) in the two pump cylinders 32, 33, one of which pumps fuel by fuel supply pipe 34 from any supply therefor, and delivers the fuel through pipe 35 to fuel nozzle 36, the other of which pumps water from a supply thereof by supply pipe 37, and delivers the water through pipe 38 a common water pipe 39 and thereby to the water pre-heater casing, which latter is generally cylindrical in form and of a relatively long length.

The other connecting rod, 28, by its integral or attached rod or axle 40, which is oscillative in the near ends of pump pistons 41, 42, reciprocates these pump pistons 41, 42, as an operating unit, these pump pistons operating in pump cylinders 43, 44, one of which draws fuel from a supply thereof by fuel supply pipe 45 and delivers the fuel through pipe 46 to annular pipe or manifold 47 and thereby to fuel nozzles 48; the other of which draws water from a supply thereof by water pipe 49 and delivers the water by water pipe 50 to the common water pipe 39, and thereby to the water pre-heater casing 51 which latter is the same as the one above designated. The water and fuel reservoirs, which are used in connection with the water and fuel pipes, as above described, are not specifically shown, as they may be of any type, such as are commonly used for such purposes.

The fuel nozzle 36 discharges the fuel into a combustion chamber 52 within the combustion chamber unit B, and the fuel there mixes with air under pressure delivered by way of a pipe 53 from the two pipes 54, 55, one of which delivers from the diffusion chamber 56 and the other delivers from the diffusion chamber 57, these diffusion chambers being the chambers into which the high pressure compressors, above described, deliver by way of diffusion blades 58, 59. The air delivered by pipe 53 passes first into an annual air chamber 60 which is annularly of the combustion chamber 52, the wall 61, which is cylindrical, having apertures 62 whereby air is discharged to the combustion chamber 52.

The fuel nozzles 48, which are disposed annularly about a secondary combustion chamber 63, discharge fuel thereto, when operative, to air contained in and uncombusted, in the gas discharge from the last stage of blade stages 64, 65, 66, of a power or work turbine 67 which is mounted on work shaft 68 and is rotated with shaft 68 independently of the rotation of the main shaft 1 and has no mechanical connection of any kind with the main shaft 1. The work turbine 67 rotates within a turbine casing 69 and drives the affixed spur gear 70 which may be used as a drive means for any means to be driven, as an automobile transmission shaft or an air propeller shaft, or a railroad locomotive transmission means. The inlet chamber 71 discharges combustion gases (with air) to the work turbine 67 and receives such gases (and air) from the pipe 72 and thereby from the combustion chamber 52. The secondary combustion chamber 63 has a spark means 73 to ignite fuel and air therein. The other has spark plug 73a.

The water pre-heater casing 51 discharges heated water (or vaporized water) by pipe 74 to the steam generating or vapor generating coil 75 which is a coil wound about the exterior wall of the pre-heater casing 51 in the annular combustion gas space 76, the latter being in direct connection to receive gas discharge from the secondary combustion chamber 63, which latter is also, when there is not secondary combustion, a discharge chamber for exhaust gases (including air) from the secondary work turbine 67.

The steam generator coil 75 conducts the steam at high pressure to an annular steam chamber 77 which is annularly of the steam nozzles or guide blades 78, which latter discharge the steam tangentially of and into the radial inward-flow blades 3 and 4, to drive the latter and the main shaft 1 and thereby the ari compressor means which is above designated as such. The pipe which conducts the steam to steam chamber 77 is designated 79 and has interposed in it, the safety valve 80, diagrammatically illustrated only, and the hand valve or main throttle valve 81. The latter is a main control for the entire operation of the device, and by it the operator or pilot or driver may increase or diminish power and generally control the apparatus.

The pump pistons 41—42 of the secondary pump unit F have a control means for automatic control of the discharge therefrom, and this control means, Figures 1, 2, 3, 4, especially Figure 2, is generally controlled by the pressure of steam in the pipe 79, from which steam may flow by pipe 82 to a pressure chamber or cylinder 83 wherein there is a pressure responsive member 84, which latter moves rod 85 against pressure of spring 86, the pressure of which may be regulated in its force by means of an adjustable threaded element 87 adjustable in bracket 88.

The rod 85 has formed with or attached to it a transverse pin 89 which it impinges either way against the prongs of the forked end 90 of the lever 91 which latter is fulcrumed at 92 and at its upper end is bifurcated and its pair of prongs 93 extending upwardly are placed one in a socket in the end of one release valve 94 and the other in the end of the other release valve 95, the former being a release valve for water pumped by the pump piston 41 and the other being a release valve for fuel pumped by the pump piston 42. The control lever 91 thus functions to simultaneously move the two release valves 94 and 95 into the positions whereby water and fuel as pumped by the secondary pump pistons 41—42 are released, that is by-passed back to the supply thereof; and the same control lever, in its opposite direction of movement, functions to move the two release valves 94—95 into the opposite positions whereby release or by-pass of the water and fuel, as pumped by pump pistons 41—42, is blocked and the same pump pistons will therefore then function to pump the water and fuel into their respective discharge pipes so that water as so pumped is delivered to the common water pipe, and the fuel as so pumped is delivered to the annular pipe or fuel manifold discharging to fuel nozzles 48 and thereby to the secondary combustion chamber 63. The release valves 94 and 95 have annular channels, such as the channel 96, Figure 3, the other release valve having a similar annular channel (not specifically shown as it is similar), and these channels cause the release ports 97—98 (Figure 4) to be simultaneously placed in connection with their respective release or by-pass pipes 99—100, respectively, the latter being each a pipe returning the by-passed fluid, water or fuel, to the supply of such fluid, these supplies being not specifically shown in the drawings.

Having described specifically the units and detailed devices comprising the invention, the general operation is now described. The fuel supply pipes will have supply of fuel from any reservoir of fuel and it is contemplated that any type of fuel as gasoline or kerosene may be used, either supply pipe receiving the fuel most suitable for it and its associated devices. The main shaft 1 will be given initial rotation by the electric motor 20, or any other starting means, and this initial rotation may be rapid or slow, in any particular construction, according to the characteristics desired, since the initial starting rotation, need be only that which will supply sufficient air and fuel and water for initial steam generation and when steam is generated this procures a more rapid rotation of the main shaft 1. It should be observed, that steam generation, is substantially of the flash generation type, except that supply of water at low heat which normally will be present in the pre-heater casing 51, supplies a sudden demand for additional steam under pressure.

The main shaft 1, according to its speed, which is the speed of the compressor rotors of unit A, and also the speed of the primary and secondary pump means, of unit A, will supply compressed air, and will supply primary fuel, and water, and will supply secondary fuel and water (when control permits), to the associated devices. Thus supply of fuel and water will at all times be substantially in proportion to the speed of the main shaft 1, and that speed will at all times be regulated, in normal operation, by the operator's (pilots) control of the main throttle valve 81. When throttle valve 81 is opened wide there is a rapid and full flow of steam under high pressure and heat to the annular steam chamber 77 and thereby to the steam radial inflow blades and thereby to the axial flow blade stages, and this flow will accordingly drive the main shaft at high speed and substantially at maximum speed, and thus air compression and fuel and water flow will be at a maximum, so that full power flow of combustion gases from combustion chamber 52 will be caused. Diminution of steam flow by partial closing or full closing of main throttle valve 81 will immediately be reflected in diminution of the speed of main shaft 1, and thereby also air compression and fuel and water flow. Flow of fuel and water from the secondary pump unit F, pump pistons 41—42, will be controlled by the pressure of steam in the steam pipe 79 and that pressure will be somewhat less than the pressure at which the safety valve permits steam release thereby. When steam pressure lowers below the control pressure the coil spring 86 will cause the rod 85 to move the control lever 91 so that the two release valves 94—95 are simultaneously moved to the release blocking position, so that then the pump pistons 41—42 will immediately commence to pump fuel and water to their pipes which discharge respectively to the fuel nozzles 48 (to combustion chamber 63) and to common water supply pipe and thereby to the steam generation casing and coil. When the steam pressure is high and exceeds the pressure as limited by the spring 86, the pressure of steam will cause the control lever 91 to move the release valves 94—95, simultaneously to the positions opening the release or by-passes to the fuel supply reservoirs (not shown), and thereupon the supply of secondary fuel and water will cease, and the primary supplies only will function. The pressure at which steam generation is thus controlled will be changeable by means of the adjusting element 87 whereby the operator may at any time increase or lower the steam operating pressure, available. Valve 94 is in open position in Figure 3.

When the secondary supply of fuel and water functions, the secondary supply of fuel, to combustion chamber 63 only, will supply combustion of fuel with the surplus supply of air in the combustion gases from combustion chamber 52. The combustion chamber 52, at its extreme leftward end, Figure 1, receives the surplus air, pumped by the compressor unit A, the latter being designed to supply such an additional or surplus supply of air as is commonly the case in gas turbine systems, that is the surplus air supplied will be at least three or four times the supply necessary for combustion of the primary fuel supply to chamber 52 and may be as much as five to six times that supply necessary for combustion of primary fuel.

In gas turbines, as commonly known and used, the air supply is generally about in the ratio of four or five times the quantity of air necessary for complete combustion of the fuel supply at normal operating power, and it is contemplated that this ratio, as commonly used will be the ratio of compressed air to fuel as supplied to the combustion chamber 52, and that the surplus air is that which cools the air sufficiently so that the gases may be utilized in the gas turbine without resulting damage to turbine blades. Thus the combustion gases as they leave combustion chamber 52 and pass to the secondary or work turbine will be generally and normally at a temperature which is about 1200 degrees Fahrenheit, and will pass through the turbine at that temperature, reduced somewhat by the work performed in the work turbine.

Gases entering combustion chamber 63 will be, therefore, at reduced pressure and temperature, but with uncombusted air approximately, in volume, three to six times the volume of combusted gases, and this surplus air will support the combustion of the fuel supplied to chamber 63, when it is supplied, according to the control thereof. Thus the secondary combustion of fuel with the surplus air or a large proportion thereof will serve to heat a quantity of water which is even greater than that normally heated by the combustion of the primary air and fuel combustion in chamber 52, that is by the residual heat of gases after work is performed in the work turbine D. The normal combustion of air and fuel and the normal heating of water, to a considerable proportion, if not generally completely supplies not only the work energy requirements of the work turbine D, but supplies also, by heating of water in the steam generation means, the energy normally necessary, or at most times, nearly that amount of energy, for operation of the steam turbine means and shaft 1 and thus for compression of the air normally used with fuel for work turbine operation. The residual heat of gases is extracted to an extent which, in normal operation, will suffice for compression of air and supply of fuel and water, for energy for the normal work performance of the primary unit and the work turbine unit, the heat transfer to the water in the steam generation means supplying sufficient energy for air compression.

In all operation other than an average or normal work load, additional power and energy for work performance both in the primary unit A and in the unit D, will be immediately available to the operator, if he then opens the main throttle valve 81 to a greater or full extent, so that a larger volume of steam will flow to the steam turbine in unit A, and that unit will speed up, to the extent necessary to provide additional compressed air and additional fuel and water, these being supplied at all times in substantially the same proportion. When the throttle valve 81 is fully opened or nearly so, the steam pressure lowers so that the valve control means for release of fuel and water, operates to close the by-passes, from the secondary pump means, and thus the additional fuel and water is supplied, until the necessity therefor, ceases and the secondary pump means becomes inoperative for fuel and water supply.

Referring now to the modified form of control, as shown in Figure 5, this control has the same effect as that of the first form of control described, but the control is otherwise effected. The pressure responsive piston 84 in this case, when steam pressure is excessive, operates to depress control lever 91 and thereby move the sleeve 101 and its attached friction plate 102, downwardly and out of contact with friction plate 103 which is attached to eccentric 26, to thereby disconnect the eccentric and cause cessation of pumping by the secondary pumps. The springs 104 operating between the friction plate 102 and plate 105 normally operate to force friction plate 102 into contact with friction plate 103. The plate 105 is axially fixed in location by the ball bearing means 106. When steam pressure lowers the friction plates 102—103 are permitted to contact and engage and thereby cause operation of the secondary pump pistons 41—42. The modified form of the apparatus is otherwise the same, except for this control means.

It is contemplated that steam condenser means may be used with my device, but such means is not shown in Figure 1, due to the complication of that figure, but such means is shown in Figure 6, wherein the steam exhaust pipes 9—10 are shown as delivering into a condenser unit 107, wherein condensed water is formed and discharged by pipe 108 for reuse in the water supply means. The condenser has passage of air through it by means of the openings 109 and 110. This condenser means functions as any steam condensation means do in steam power plants, and further specific or detailed illustration is therefore not required.

The fuel supply to nozzle 36 by pipe 35 from the associated fuel pump may be modified, to increase or diminish the supply, by a by-pass of fuel controlled by hand valve 111, the by-pass being designated 112, but this control may be eliminated and only that procured by the steam flow control utilized in any particular construction. Fuel and water proportions, by either the normal or the supplemental pumping means may be such as is required for any type of fuel and as may be determined to be best for efficiency and use. Any temperature control, in addition to controls used, may be utilized in any construction, such means being as commonly used, if found desirable.

While I have shown particular devices and combinations of devices in the illustration of my invention, I contemplate and intend, that other detailed devices and combinations of devices, may be used in the realization of my invention, without departing from the contemplation and intent thereof.

What I claim is:

1. In a power production means: a primary unit, including, a primary turbine having a primary turbine rotor, an air compressor rotor driven by the primary turbine rotor, a primary fuel pumping means in driven connection with the primary turbine rotor to supply fuel, a primary work fluid pumping means in driven connection with the primary turbine rotor to supply primary work fluid under pressure, a supplemental fuel pumping means having implementation with the primary turbine rotor and to supply fuel, a supplemental primary work fluid pumping means having implementation with the primary turbine rotor and to supply primary work fluid under pressure; a combustion chamber means in conductive connection with the air compressor rotor to receive air under pressure as inducted and compressed by the air compressor rotor and receiving fuel from said primary fuel pumping means; a secondary work driving turbine in conductive connection with the discharge from said combustion chamber means to receive combustion gases therefrom and having a work driving turbine rotor to be driven by the combustion gases; a primary work fluid heat absorption conduit means having conduit space to receive gases from said secondary work driving turbine and having primary work fluid passage means separated from said conduit space by heat transfer walls enclosing said primary work fluid passage means; a conductive connection from said primary work fluid passage means to said primary turbine for passage of the heated primary work fluid to drive the primary turbine rotor; an exhaust from the primary turbine rotor; a conductive connection from the primary work fluid pumping means to the primary work fluid passage means to conduct primary work fluid thereto; the said driven air compressor rotor and primary fuel pumping means and primary work fluid pumping means of the primary unit procuring supply of air and fuel and primary work fluid to the conductively connected means in proportion to the speed of rotation of said primary turbine rotor, substantially; the said secondary work driving turbine and said conduit space of said primary work fluid heat absorption conduit means having interposed therebetween a supplemental combustion space through which combustion gases from the secondary work driving turbine pass to said conduit space; the said supplemental fuel pumping means having conductive connection to nozzle means discharging to said supplemental combustion space; the said supplemental primary work fluid pumping means having conductive connection to the primary work fluid passage means to conduct supplemental primary work fluid thereto; the said supplemental fuel pumping means and said supplemental primary work fluid pumping means procuring, as controlled, supply of fuel to said supplemental combustion space, and supply of primary work fluid to said primary work fluid passage means; the said primary turbine rotor and means driven and in implementation therewith being dynamically independent of the gas stream from said combustion chamber means and the secondary turbine work driving rotor of the secondary turbine; and means for the control of the supplemental fuel pumping means and the supplemental primary work fluid pumping means to increase or diminish the supply by such supplemental means to the conductively connected means.

2. The means for the power production, as defined in claim 1, and: the means for the control of the supplemental fuel pumping means and the supplemental primary work fluid pumping means being further defined as means to simultaneously increase the supplies thereby or to simultaneously diminish the supplies thereby.

3. The means for power production, as defined in claim 1, and: the means for the control of the supplemental fuel pumping means and the supplemental primary work fluid pumping means being further defined as means to simultaneously procure by-passing of the fuel pumped thereby to the fuel supply for the fuel pumping means and to procure by-passing and release of the primary work fluid as pumped by said supplemental primary work fluid pumping means.

4. The means for power production, as defined in claim 1, and: the means for the control of the supplemental fuel pumping means and the supplemental primary work fluid pumping means being further defined as, means to effect engagement of the implementation of the said pumping means, with the primary turbine rotor or disengagement of the implementation of the said pumping means with the primary turbine rotor.

5. The means as defined in claim 1, and: means for the control and modulation of the flow of primary work fluid to the primary turbine.

6. The means as defined in claim 1, and: means for the control and modulation of the flow of fuel from said primary fuel pumping means to the combustion chamber means in conductive connection therewith for supply of fuel thereto.

7. The means as defined in claim 1, and: the means for the control of the supplemental fuel pumping means and the supplemental primary work fluid pumping means being further defined as a pressure responsive means responsive to pressure in said primary work fluid passage means and means in inter-action therewith to simultaneously increase the supplies by each of said supplemental pumping means or to simultaneously diminish the said supplies by each of said supplemental pumping means.

8. The means as defined in claim 1, and: the means for the control of the supplemental fuel pumping means and the supplemental primary work fluid pumping means being further defined as a pressure responsive means responsive to pressure in said primary work fluid passage means and means in inter-action therewith to simultaneously procure by-passing of the fuel pumped thereby back to the fuel supply for the fuel pumping means and to procure by-passing and release of the primary work fluid as pumped by said supplemental work fluid pumping means.

9. In power production means; a casing and bearing means and a rotor shaft mounted axially of said bearing means and having fixed therewith a compressor rotor means and a steam rotor means; the said casing including steam nozzle means to guide steam to said steam rotor means, the said casing having air induction means for the compressor rotor means; a combustion chamber in conductive connection with said compressor rotor means to receive air compressed thereby; a discharge from the combustion chamber receiving combustion gases and supplemental compressed air from said compressor rotor means; fuel pumping means operatively inter-connected with the rotor shaft to be driven thereby and supplying fuel to said combustion chamber; water pumping means operatively inter-connected with the rotor shaft to be driven thereby and to supply water under pressure from a water supply; a work turbine having a passage means therethrough in conductive connection with the discharge from the combustion chamber to receive combustion gases and air therefrom; an exhaust from said work turbine and gas passages of heat transfer means receiving gases from said exhaust, the said heat transfer means including steam generator conduit means in heat transfer relation with the gas passages with heat transfer therebetween; a conductive connection between said steam generator conduit means and said water pumping means for delivery of water therefrom to the steam generator conduit means; a conductive connection from said steam generator conduit means to said steam nozzle means for passage of steam to said steam nozzle means; the said steam rotor means being mechanically and dynamically independent of the gas discharging from said combustion chamber and the work turbine driven thereby; a supplemental fuel pumping means and a supplemental water pumping means, each of said supplemental pumping means including means for operation thereof by said steam rotor means at a speed proportional to the speed of said steam rotor means; the said supplemental fuel pumping means having delivery of fuel as pumped to the stream of gases and air discharging through said exhaust from said work turbine for combustion with the air passing therethrough, the supplemental combustion thereby providing supplemental heat for absorption by water or vaporized water in said steam generator conduit means; the said supplemental water pumping means delivering to said steam generator conduit means to be heated therein for supplemental supply of steam discharging to said steam rotor means; and means for unison control of said supplemental fuel and water pumping means to diminish or enlarge the supplies thereof respectively to said exhaust and to said steam generator conduit means.

10. The means as defined in claim 9, and: the means for unison control of said supplemental fuel and water pumping means to diminish or enlarge the supplies thereof respectively to said exhaust and to said steam generating conduit means being further defined as including pressure responsive means responsive to pressure of steam in said steam generating conduit means to actuate said means for unison control to simultaneously increase the supplies by each of said supplemental pumping means or to simultaneously diminish the said supplies by said supplemental pumping means.

References Cited in the file of this patent

UNITED STATES PATENTS

| 1,948,537 | Noack | Feb. 27, 1934 |

FOREIGN PATENTS

| 6,088 | Great Britain | Mar. 10, 1914 |
| 331,763 | Great Britain | July 10, 1930 |